United States Patent
Nagino et al.

(10) Patent No.: US 9,620,756 B2
(45) Date of Patent: Apr. 11, 2017

(54) SEPARATOR-INTEGRATED ELECTRODE AND NONAQUEOUS ELECTROLYTE SECONDARY BATTERY

(71) Applicants: SANYO Electric Co., Ltd., Daito-shi, Osaka (JP); PANASONIC CORPORATION, Kadoma-shi, Osaka (JP)

(72) Inventors: Toshifumi Nagino, Osaka (JP); Yasunori Baba, Osaka (JP); Atsushi Fukui, Osaka (JP)

(73) Assignees: SANYO Electric Co., Ltd., Daito-shi, Osaka (JP); PANASONIC CORPORATION, Kadoma-shi, Osaka (JP)

( * ) Notice: Subject to any disclaimer, the term of this patent is extended or adjusted under 35 U.S.C. 154(b) by 0 days.

(21) Appl. No.: 14/425,246

(22) PCT Filed: Aug. 26, 2013

(86) PCT No.: PCT/JP2013/005014
§ 371 (c)(1),
(2) Date: Mar. 2, 2015

(87) PCT Pub. No.: WO2014/049949
PCT Pub. Date: Apr. 3, 2014

(65) Prior Publication Data
US 2015/0249243 A1   Sep. 3, 2015

(30) Foreign Application Priority Data
Sep. 27, 2012   (JP) ................................. 2012-214448

(51) Int. Cl.
*H01M 10/0525*   (2010.01)
*H01M 10/052*   (2010.01)
(Continued)

(52) U.S. Cl.
CPC .......... *H01M 2/1673* (2013.01); *D04H 1/413* (2013.01); *D04H 1/728* (2013.01);
(Continued)

(58) Field of Classification Search
None
See application file for complete search history.

(56) References Cited

U.S. PATENT DOCUMENTS

2012/0237832 A1* 9/2012 Nakagiri ................. H01M 2/16
429/246
2012/0282498 A1   11/2012 Eichinger

FOREIGN PATENT DOCUMENTS

| JP | 3371301 B2 | 1/2003 |
| JP | 2008-210541 A | 9/2008 |

(Continued)

OTHER PUBLICATIONS

English translation of JP 2012059486 (2012).*
International Search Report dated Nov. 26, 2013 issued in corresponding application No. PCT/JP2013/005014.

*Primary Examiner* — Yoshitoshi Takeuchi
(74) *Attorney, Agent, or Firm* — Westerman, Hattori, Daniels & Adrian, LLP

(57) ABSTRACT

Provided are a separator-integrated electrode and a nonaqueous electrolyte secondary battery with a reduced risk of a short circuit between electrodes due to precipitation of metallic lithium on a surface of an electrode mixture layer. A positive electrode (12) configured as a separator-integrated electrode includes a positive current collector (22), a positive active material layer (24) formed on a surface thereof, a first porous layer (26) formed on a surface of the positive active material layer (24) and containing inorganic particles, and a second porous layer (28) formed on a surface of the first porous layer (26) and made of resin fibers.

8 Claims, 1 Drawing Sheet

(51) Int. Cl.
    *H01M 10/05*       (2010.01)
    *H01M 2/16*        (2006.01)
    *D04H 1/413*      (2012.01)
    *D04H 1/728*      (2012.01)
    *H01M 10/0585*    (2010.01)
    *H01M 10/0566*    (2010.01)

(52) U.S. Cl.
    CPC ......... *H01M 2/162* (2013.01); *H01M 2/1626* (2013.01); *H01M 2/1646* (2013.01); *H01M 2/1666* (2013.01); *H01M 2/1686* (2013.01); *H01M 10/05* (2013.01); *H01M 10/052* (2013.01); *H01M 10/0585* (2013.01); *H01M 10/0566* (2013.01)

(56) References Cited

FOREIGN PATENT DOCUMENTS

| | | | | |
|---|---|---|---|---|
| JP | 2010-225809 A | 10/2010 | | |
| JP | 2011-258462 A | 12/2011 | | |
| JP | 2012-59486 A | 3/2012 | | |
| JP | 2012059486 | * 3/2012 | .......... | H01M 10/052 |
| JP | 2012-134024 A | 7/2012 | | |
| WO | 2011/072792 A1 | 6/2011 | | |

\* cited by examiner

SEPARATOR-INTEGRATED ELECTRODE AND NONAQUEOUS ELECTROLYTE SECONDARY BATTERY

TECHNICAL FIELD

The present invention relates to separator-integrated electrodes and nonaqueous electrolyte secondary batteries including separator-integrated electrodes.

BACKGROUND ART

Recent years have seen a significant reduction in the size and weight of mobile information terminals such as cellular phones and laptop computers, and there is a need for a battery with a higher capacity as their power supply. Although nonaqueous electrolyte secondary batteries, such as lithium (Li) ion batteries, which have particularly high energy density among secondary batteries, have increasingly high capacities, the above need has yet to be satisfied. Recently, nonaqueous electrolyte secondary batteries have been used in a broader range of applications due to their characteristics. For example, nonaqueous electrolyte secondary batteries have increasingly been used not only in mobile applications such as cellular phones, portable computers, PDAs, and portable music players, but also in medium to large battery applications, including power applications such as electric tools, electric bicycles, electric vehicles (EVs), and hybrid electric vehicles (HEVs and PHEVs) and storage applications such as backup power supplies and power storage systems.

With the increasing applications of nonaqueous electrolyte secondary batteries, nonaqueous electrolyte secondary batteries having an increasingly wide variety of structures have been developed. Examples of such nonaqueous electrolyte secondary batteries include cylindrical batteries including a rolled electrode assembly composed of electrodes and a separator rolled together, rectangular batteries including a rolled electrode assembly pressed and inserted into a rectangular casing or covered with a laminate casing, rectangular batteries including an electrode assembly composed of electrodes and separators stacked on top of each other and inserted into a rectangular casing or covered with a laminate casing, and button batteries.

The development of nonaqueous electrolyte secondary batteries of various shapes has complicated the manufacturing processes of nonaqueous electrolyte secondary batteries. This leads to decreased productivity, including increased manufacturing costs of nonaqueous electrolyte secondary batteries and an extended lead time. Accordingly, it is essential to develop a technique for simplifying the manufacturing processes of an increasingly wide variety of nonaqueous electrolyte secondary batteries.

Polyolefin fine porous films, which are used as separators in nonaqueous electrolyte secondary batteries, increase the cost of battery materials and involve a complicated manufacturing process and an extended lead time due to the need for the steps of stacking and rolling together with electrodes. Accordingly, the inventors have made various attempts to develop a battery including no conventional polyolefin fine porous film, i.e., a separatorless battery.

Conventional nonaqueous electrolytes secondary batteries include a separator made of an insulating porous material through which lithium ions pass between positive and negative electrode plates. The separator is a fine porous film of a polyolefin such as polyethylene or polypropylene. To develop a nonaqueous electrolyte secondary battery including no such separator, i.e., a separatorless battery, a porous layer of a low-cost material must be directly formed on a surface of an electrode to replace a polyolefin fine porous film.

PTL 1 below discloses an invention related to a nonaqueous electrolyte secondary battery that includes a negative electrode including a current collector and a negative active material coating layer disposed thereon, a positive electrode including a current collector and a positive active material coating layer disposed thereon, a separator, and a nonaqueous electrolyte. A porous protective film having a thickness of 0.1 to 200 μm and containing a resin binder and fine solid particles of alumina or silica powder having particle sizes in the range from 0.1 to 50 μm is formed on a surface of the positive or negative active material coating layer. PTL 2 below discloses an invention related to a separator-electrode-integrated storage element for electrochemical devices that includes an electrode and a separator integrated with a surface thereof. The separator is a porous layer containing fibers formed by electrospinning.

CITATION LIST

Patent Literature

PTL 1: Japanese Patent No. 3371301
PTL 2: Japanese Published Unexamined Patent Application No. 2010-225809

SUMMARY OF INVENTION

Technical Problem

According to the invention disclosed in PTL 1 above, the porous protective film formed on the surface of the positive or negative active material coating layer provides a nonaqueous electrolyte secondary battery with a reduced risk of an internal short circuit due to freed active material. According to the invention disclosed in PTL 2 above, the fiber-containing porous layer formed on the surface of the active material layer provides a separator-electrode integrated storage element for electrochemical devices with reduced internal resistance that includes a thinner porous layer with sufficient mechanical strength.

The results of experiments conducted by the inventors, however, have revealed that separatorless nonaqueous electrolyte secondary batteries including a positive or negative electrode having a porous layer made of solid particles or containing fibers having diameters of less than 1 μm on a surface of an active material layer suffer an internal short circuit due to precipitation of dendrites of metallic lithium on the surface of the active material layer during initial charge.

A porous layer made of solid particles or containing fibers having diameters of less than 1 μm tends to have uneven texture if the porous layer is thin, i.e., several tens of micrometers thick. This results in a distribution of areas with low resistance to passage of lithium ions. During initial charge, the lithium ion concentration increases in those areas with low resistance to passage of lithium ions. As a result, dendrites of metallic lithium precipitate on the surface of the active material layer and cause a physical short circuit between the positive and negative electrodes.

The present invention provides a separator-integrated electrode including a porous layer with a reduced risk of a short circuit between positive and negative electrodes due to precipitation of metallic lithium on a surface of a positive or negative active material layer and also provides a nonaqueous electrolyte secondary battery including such a separator-integrated electrode.

Solution to Problem

A separator-integrated electrode according to the present invention includes a current collector, an active material layer formed on the current collector, and a porous layer formed on the active material layer. The porous layer contains inorganic particles and resin fibers.

Because the porous layer formed on the surface of the active material layer in the separator-integrated electrode according to the present invention contains inorganic particles and resin fibers, the porous layer has a more even texture and a smaller area with low resistance to passage of lithium ions than conventional porous layers. The separator-integrated electrode according to the present invention is therefore resistant to precipitation of dendrites of metallic lithium due to increased lithium ion concentration in the low-resistance area. Thus, the nonaqueous electrolyte secondary battery including the separator-integrated electrode according to the present invention has a reduced risk of a short circuit between electrodes and improved reliability and electrochemical characteristics.

The resin fibers forming the separator-integrated electrode according to the present invention are preferably a fibrous resin material having diameters of from one to several hundreds of nanometers, although a fibrous resin material having diameters of several micrometers can also be used. The separator-integrated electrode according to the present invention is applicable to either a positive electrode including a positive current collector and a positive active material layer formed on a surface thereof or a negative electrode including a negative electrode current collector and a negative active material layer formed on a surface thereof.

In the separator-integrated electrode according to the above aspect, the porous layer preferably includes a first porous layer formed on the active material layer and containing the inorganic particles and a second porous layer formed on the first porous layer and containing the resin fibers.

The thus-configured porous layer, in which the first porous layer containing the inorganic particles and the second porous layer made of the resin fibers are formed on the surface of the active material layer, exhibits good characteristics based on the difference between the materials for the individual porous layers.

In the separator-integrated electrode according to the above aspect, the relationship $0.5 \leq x/(x+y) \leq 0.95$ is preferably satisfied, where x is the average thickness of the second porous layer, and y is the average thickness of the first porous layer.

If the value of $x/(x+y)$, which is the thickness x of the porous layer made of the resin fibers divided by the sum $(x+y)$ of the thickness of the porous layer containing the inorganic particles and the thickness of the porous layer made of the fibers, is less than 0.5, the porous layer containing the inorganic particles and the porous layer made of the fibers have an uneven resistance distribution, which tends to result in an internal short circuit. If the value of $x/(x+y)$ is more than 0.95, the porous layer made of the resin fibers has a smaller distribution of areas with low resistance to passage of lithium ions; however, such a value of $x/(x+y)$ is undesirable because of increased internal resistance.

In the separator-integrated electrode according to the above aspect, the resin fibers forming the second porous layer is preferably made of at least one polymeric material selected from polypropylene, polyethylene, polystyrene, polyethylene oxide, polyethylene terephthalate, polybutylene terephthalate, polyethylene naphthalate, poly-m-phenylene terephthalate, poly-p-phenylene isophthalate, polyvinylidene fluoride, polytetrafluoroethylene, poly(vinylidene fluoride-tetrafluoroethylene) copolymer, poly(vinylidene fluoride-hexafluoropropylene) copolymer, poly(vinylidene fluoride-tetrafluoroethylene-hexafluoropropylene) copolymer, poly(tetrafluoroethylene-hexafluoropropylene) copolymer, polyvinyl chloride, polyvinylidene chloride-acrylate copolymer, polyacrylonitrile, polyacrylonitrile-methacrylate copolymer, polycarbonates, polyarylates, polyester carbonates, polyamides, aramids, polyimides, polycaprolactone, polylactic acid, polyvinyl alcohol, polyglycolic acid, collagen, polyhydroxybutyric acid, polyvinyl acetate, polypeptides, and copolymers thereof.

A second porous layer formed using such resin fibers has good electrical insulation properties and porosity. A nonaqueous electrolyte secondary battery including such a second porous layer is more resistant to precipitation of dendrites of lithium and thus has a reduced risk of an internal short circuit.

In the separator-integrated electrode according to the above aspect, the inorganic particles in the first porous layer are preferably at least one material selected from titania (excluding anatase), alumina, zirconia, and magnesia.

These inorganic particles have good electrical insulation properties, low cohesion, and good dispersibility in solvent and thus facilitate formation of a homogeneous first porous layer.

In the separator-integrated electrode according to the above aspect, the resin fibers forming the second porous layer is preferably formed by electrospinning.

Electrospinning facilitates shape control and elongation of the resulting fibers and permits a wide selection of resin materials as compared to other processes. In addition, electrostatic force allows the fibers to readily enter pores in the insulating first porous layer. This stabilizes the formation of the second porous layer and increases the adhesion strength between the first and second porous layers.

A nonaqueous electrolyte secondary battery according to the present invention includes one of the above separator-integrated electrodes and a counter electrode paired with the separator-integrated electrode. The counter electrode includes a current collector and a counter active material layer formed on a surface of the current collector. The counter active material layer is disposed opposite and in contact with the second porous layer of the separator-integrated electrode. The first and second porous layers of the separator-integrated electrode are impregnated with a nonaqueous electrolyte solution. The nonaqueous electrolyte secondary battery may include a separate separator.

The nonaqueous electrolyte secondary battery according to the present invention has a reduced risk of a short circuit between the electrodes and thus has high reliability.

DESCRIPTION OF EMBODIMENTS

An embodiment of the present invention will now be described in detail. The following embodiment is given by way of illustration for a better understanding of the technical idea of one aspect of the present invention and is not intended to limit the present invention. Rather, various modifications are possible without departing from the technical idea set forth in the claims. The separator-integrated electrode according to the present invention is applicable to either a positive electrode or a negative electrode. The following description will be directed primarily to a positive electrode.

Figure 1:
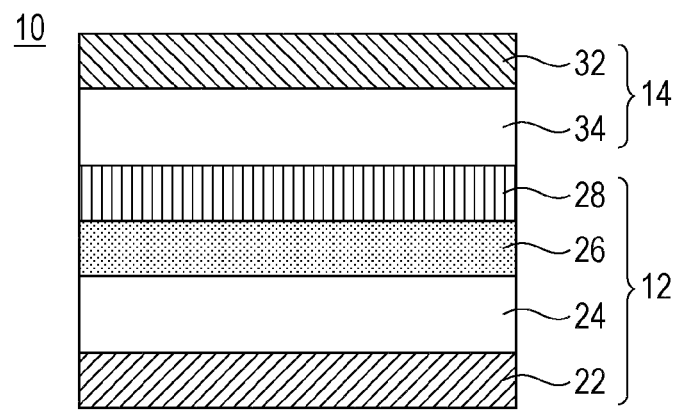
FIG. 1 is a schematic sectional view of a nonaqueous electrolyte secondary battery according to an embodiment.

A nonaqueous electrolyte secondary battery 10 according to this embodiment will now be described with reference to FIG. 1. The nonaqueous electrolyte secondary battery 10 according to this embodiment includes a positive electrode 12 configured as a separator-integrated electrode and a negative electrode 14 disposed on the separator-integrated positive electrode 12.

The positive electrode 12 includes, in sequence, a positive current collector 22, a positive active material layer 24, a first porous layer 26 containing inorganic particles, and a second porous layer 28 containing a resin material. The negative electrode 14 includes a negative current collector 32 and a negative active material layer 34 disposed thereon.

Specifically, the positive current collector 22 of the positive electrode 12 is made of aluminum or aluminum alloy. The positive active material layer 24 is formed on a surface of the positive current collector 22. The first porous layer 26 is formed on a surface of the positive active material layer 24 facing away from the positive current collector 22. The second porous layer 28 is formed on a surface of the first porous layer 26 facing away from the positive active material layer 24.

Examples of positive active materials capable of absorbing and releasing lithium ions for the positive active material layer 24 include lithium cobalt oxide ($LiCoO_2$), lithium manganese oxide ($LiMn_2O_4$ and $LiMnO_2$), lithium nickel oxide ($LiNiO_2$), lithium nickel cobalt oxide ($LiNi_xCo_{1-x}O_2$ (where x=0.01 to 0.99)), lithium nickel manganese cobalt oxide ($LiNi_xMn_yCo_zO_2$ (where x+y+z=1)), and lithium iron phosphate ($LiFePO_4$), which can be used alone or in a mixture. Lithium cobalt oxides containing other metal elements such as zirconium, magnesium, and aluminum can also be used.

The first porous layer 26 is made of, for example, inorganic particles and a resin material. Examples of inorganic particles include titania ($TiO_2$), alumina ($Al_2O_3$), zirconia ($ZrO_2$), and magnesia (MgO). The titania is preferably rutile. Rutile is more resistant to insertion and extraction of lithium ions and thus is more resistant to, for example, absorption of lithium ions and electrical conduction due to the ambient atmosphere (potential) than anatase. This reduces the decrease in capacity and the risk of a short circuit. The inorganic particles preferably have an average particle size of 1 μm or less. For reasons of dispersibility in slurry, it is particularly prepared to use inorganic particles surface-treated with aluminum (Al), silicon (Si), titanium (Ti), or the like.

The resin material for the first porous layer 26 may be a water-insoluble resin or a water-soluble resin. Examples of water-insoluble resins include polymethyl methacrylate, polyethylene terephthalate, polybutylene terephthalate, polyethylene naphthalate, polyvinylidene fluoride, polyacrylonitrile, polyimides, polyamides, polyamide-imides, and polytetrafluoroethylene. Examples of water-soluble resins include polyvinyl alcohol, polyvinylpyrrolidone, polyacrylamide, polyvinyl methyl ether, and polyethylene glycol.

The resin material for the first porous layer 26 is preferably dissolved in a solvent different from the solvent used in the positive active material slurry for the positive active material layer. Thus, if the first porous layer 26 is formed on a surface of a positive active material layer formed from a positive active material slurry prepared using N-methyl-2-pyrrolidone (NMP) as a solvent, the resin material for the first porous layer 26 is preferably dissolved in water.

Examples of solvents for dispersion of the inorganic particles and dissolution of the resin material to form the first porous layer 26 include organic solvents such as N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), and γ-butyrolactone. Any of these and other solvents for dispersion of the inorganic particles and dissolution of the resin material may be selected depending on the solubility of the resin material.

The first porous layer 26 can be formed on the surface of the positive active material layer 24 by applying a slurry prepared by dispersing the inorganic particles and dissolving the resin material in a solvent to the surface of the positive active material layer 24 or by other processes such as gravure coating, spray coating, die coating, roller coating, dip coating, and screen printing.

The second porous layer 28 is made of fibers. Examples of resin materials for the fibers include polymeric materials such as polypropylene, polyethylene, polystyrene, polyethylene oxide, polyethylene terephthalate, polybutylene terephthalate, polyethylene naphthalate, poly-m-phenylene terephthalate, poly-p-phenylene isophthalate, polyvinylidene fluoride, polytetrafluoroethylene, poly(vinylidene fluoride-tetrafluoroethylene) copolymer, poly(vinylidene fluoride-hexafluoropropylene) copolymer, poly(vinylidene fluoride-tetrafluoroethylene-hexafluoropropylene) copolymer, poly(tetrafluoroethylene-hexafluoropropylene) copolymer, polyvinyl chloride, polyvinylidene chloride-acrylate copolymer, polyacrylonitrile, polyacrylonitrile-methacrylate copolymer, polycarbonates, polyarylates, polyester carbonates, polyamides, aramids, polyimides, polycaprolactone, polylactic acid, polyvinyl alcohol, polyglycolic acid, collagen, polyhydroxybutyric acid, polyvinyl acetate, polypeptides, and copolymers thereof. These resin materials may be used alone or in a mixture. These resin materials are illustrative only, and other resin materials may be used for the fibers.

The second porous layer 28, which is made of fibers, can be formed on the surface of the first porous layer 26 by known processes such as electrospinning, self-assembly, and phase separation. Electrospinning is preferred for its productivity and stability. Electrospinning is a process in which a high voltage is applied between a spinning solution stored in a container and a collector electrode on the target side to force the spinning solution out of the container and deposit it on the target in the form of fine charged fibers. In this embodiment, the second porous layer 28 may be formed on the surface of the first porous layer 26 using the positive electrode current collector 22 as the collector electrode.

The second porous layer 28 may be formed by electrospinning as follows. The resin material is first mixed and dispersed in a solvent to prepare a spinning solution. The resin material may be mixed and dispersed in the solvent in any manner, for example, using a planetary mixer, a homomixer, a pin mixer, a kneader, or a homogenizer. During the mixing and dispersion of the resin material in the solvent, various additives such as inorganic particles, dispersants, surfactants, stabilizers, and crosslinkers may be added if necessary.

The spinning solution is supplied to a nozzle and is forced out of the nozzle while being electrostatically charged by an electric field. The charged spinning solution is electrically attracted by the electrode on the collector side and is stretched into a fiber. In electrospinning, as the resulting fiber flies toward the collector, the fiber is accelerated by the electric field and is electrically stretched into a thinner fiber. At the same time, the fiber becomes thinner as the solvent evaporates and is split into even thinner fibers by electrical repulsion due to increased electrostatic density. The voltage applied to generate the electric field is preferably, but not necessarily, about 5 to 50 kV. The polarity of the applied voltage may be either positive or negative. The resulting fiber layer may be pressed to adjust the porosity of the fiber layer.

Examples of solvents for the spinning solution include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, chloroform, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide, dimethyl sulfoxide, pyridine, and water. These solvents may be used alone or in a mixture. These solvents are illustrative only, and other solvents may be used for the spinning solution.

Examples of inorganic materials for the spinning solution include oxides, carbides, nitrides, borides, silicides, fluorides, and sulfides. For reasons of the properties of the fibers to be manufactured, such as heat resistance and workability, it is preferred to use oxides as the inorganic material for the spinning solution.

Examples of oxides for the spinning solution include $Al_2O_3$, $SiO_2$, $TiO_2$, $Li_2O$, $Na_2O$, $MgO$, $CaO$, $SrO$, $BaO$, $B_2O_3$, $P_2O_5$, $SnO_2$, $ZrO_2$, $K_2O$, $Cs_2O$, $ZnO$, $Sb_2O_3$, $As_2O_3$, $CeO_2$, $V_2O_5$, $Cr_2O_3$, $MnO$, $Fe_2O_3$, $CoO$, $NiO$, $Y_2O_3$, $Lu_2O_3$, $Yb_2O_3$, $HfO_2$, and $Nb_2O_5$. These oxides may be used alone or in a mixture. These oxides are illustrative only, and other oxides may be used for the spinning solution.

The proportions of the solvent and the solute in the spinning solution vary depending on the types of solvent and solute selected. Preferably, the solvent is used in an amount of from about 60% to about 98% by mass, and the solute is preferably used in an amount of from 20 to 40% by mass.

The negative current collector 32 of the negative electrode 14 is made of copper or copper alloy, and the negative active material layer 34 is disposed thereon. Examples of negative active materials capable of absorbing and releasing lithium ions for the negative active material layer 34 include carbonaceous materials such as graphite, non-graphitizable carbon, and graphitizable carbon; titanium oxides such as $LiTiO_2$ and $TiO_2$; metalloid elements such as silicon and tin; silicon oxides ($SiO_x$, where $0.5 \leq x < 1.6$); and tin-cobalt alloys.

Example 1

The fabrication of a nonaqueous electrolyte secondary battery of Example 1 will now be described.

Fabrication of Separator-Integrated Electrode

A separator-integrated electrode was fabricated as follows.

Formation of Positive Electrode

A positive active material slurry was prepared by weighing lithium cobaltate ($LiCoO_2$) as a positive active material, acetylene black as a conductor, and polyvinylidene fluoride (PVdF) as a binder in a mass ratio of 95:2.5:2.5 and mixing them with N-methyl-2-pyrrolidone (NMP) as a dispersion medium. The positive active material slurry was applied to a surface of an aluminum foil as a positive current collector with a die coater and was dried to remove the organic solvent, i.e., NMP. The coated positive electrode was pressed to a predetermined thickness with a roller press and was cut to a predetermined size to obtain a positive electrode.

Formation of First Porous Layer

A titanium oxide dispersion slurry was prepared by weighing titanium oxide (KR-380, available from Nippon Titan Kogyo, Ltd.) as inorganic particles and an acrylic resin in a ratio of 3.75:96.25, mixing them with water as a dispersion medium to obtain a mixture with a solid content of 30% by mass, and dispersing the mixture by mixing with a FILMIX mixer (available from Tokushu Kika Kogyo Co., Ltd. FILMIX). The titanium oxide dispersion slurry was applied to a surface of the positive active material layer by gravure coating and was dried to remove the dispersant to form a first porous layer having a thickness of 8 μm.

Formation of Second Porous Layer

A spinning solution was prepared by mixing a polyvinyl alcohol resin (PVA) with water in a concentration of 10% by mass and dispersing the mixture by mixing with a T.K. ROBOMIX mixer (available from Tajima Kagaku Kikai K.K.). The spinning solution was electrospun at an applied voltage of 30 kV and was then pressed to form a second porous layer with a weight of 10 g/m$^2$ and a thickness of 23 μm. Thus, a separator-integrated electrode according to an embodiment was fabricated.

Fabrication of Negative Electrode

A negative electrode was fabricated as follows.

A negative active material slurry was prepared by weighing a carbonaceous material (graphite) as a negative active material, sodium carboxymethyl cellulose (CMC) as a thickener, and styrene-butadiene rubber (SBR) as a binder in a mass ratio of 98:1:1 and dispersing them in water. The negative active material slurry was applied to each surface of a copper foil as a negative current collector with a die coater and was dried to form a negative active material layer on each surface of the negative current collector. The coated negative electrode was pressed to a predetermined thickness with a press roller and was cut to a predetermined size to obtain a negative electrode.

Preparation of Nonaqueous Electrolyte Solution

A nonaqueous electrolyte solution was prepared as follows. Lithium hexafluorophosphate ($LiPF_6$) was dissolved as an electrolyte salt in a nonaqueous solvent containing ethylene carbonate (EC) and diethyl carbonate (DEC) in a volume ratio of 3:7 (at 1 atm and 25° C.) in a concentration of 1.0 mol/L.

Assembly of Nonaqueous Electrolyte Secondary Battery

A separatorless nonaqueous electrolyte secondary battery was fabricated as follows. Leads (not shown) were attached to the separator-integrated electrode and the negative electrode, and they were stacked on top of each other to form an electrode assembly. The electrode assembly was inserted into a battery casing made of an aluminum laminate. The nonaqueous electrolyte solution was injected and sealed in the battery casing.

Example 2

A nonaqueous electrolyte secondary battery of Example 2 was fabricated as in Example 1 except that a first porous layer having a thickness of 13 μm and a second porous layer having a thickness of 17 μm were formed in the fabrication of the separator-integrated electrode.

Comparative Example 1

A nonaqueous electrolyte secondary battery of Comparative Example 1 was fabricated as in Example 1 except that a second porous layer having a thickness of 24 μm was formed without forming the first porous layer in the fabrication of the separator-integrated electrode.

Comparative Example 2

A nonaqueous electrolyte secondary battery of Comparative Example 2 was fabricated as in Example 1 except that a first porous layer having a thickness of 30 μm was formed without forming the second porous layer in the fabrication of the separator-integrated electrode.

Internal Short Circuit Test

The nonaqueous electrolyte secondary batteries of Examples 1 and 2 and Comparative Examples 1 and 2 fabricated as described above were subjected to an internal short circuit test. The internal short circuit test is summarized below.

Each of the nonaqueous electrolyte secondary batteries of Examples 1 and 2 and Comparative Examples 1 and 2 was tested for its charge behavior during charge at a constant current of 0.2 It to a battery voltage of 4.4 V. The occurrence of an internal short circuit was determined as follows: a battery that failed to reach a battery voltage of 4.4 V when the battery was charged to the design capacity during charge to a battery voltage of 4.4 V was determined to suffer an internal short circuit, whereas a battery that reached a battery voltage of 4.4 V was determined to suffer no internal short circuit. This is based on the fact that an internal short circuit in a nonaqueous electrolyte secondary battery causes a very low short-circuit current to flow between the positive and negative electrodes and thus prevents the battery voltage from rising normally when the battery is charged to the design capacity.

The results of the internal short circuit test for the nonaqueous electrolyte secondary batteries of Examples 1 and 2 and Comparative Examples 1 and 2 are summarized in Table 1 together with the thickness y of the first porous layer, the thickness x of the second porous layer, and the value of x/(x+y).

TABLE 1

| | Thickness y of inorganic particle porous layer (μm) | Thickness x of fiber layer (μm) | x/(x + y) | Internal short circuit |
|---|---|---|---|---|
| Comparative Example 1 | 0 | 24 | 1.00 | Occurred |
| Example 1 | 8 | 23 | 0.74 | None |
| Example 2 | 13 | 17 | 0.57 | None |
| Comparative Example 2 | 30 | 0 | 0 | Occurred |

The results shown in Table 1 indicate the following facts. Specifically, no internal short circuit occurred in Examples 1 and 2, in which the first and second porous layers were both formed. In contrast, an internal short circuit occurred in Comparative Examples 1 and 2, in which one of the first and second porous layers was not formed.

In the range of x/(x+y) from 0.5 to 0.9 (i.e., 0.5≤x/(x+y) ≤0.95), where x/(x+y) is the thickness x of the second porous layer divided by the sum of the thickness y of the first porous layer and the thickness x of the second porous layer, the first and second porous layers were more effective in avoiding an internal short circuit than outside the above range while allowing the electrolyte solution to permeate into the electrode.

The positive active material layer 24 may be formed on each surface of the positive current collector 22. The first porous layer 26 and the second porous layer 28 may then be formed on the positive active material layer 24 on each side, and the negative electrode 14 may be disposed on each side.

Modification

Figure 2:
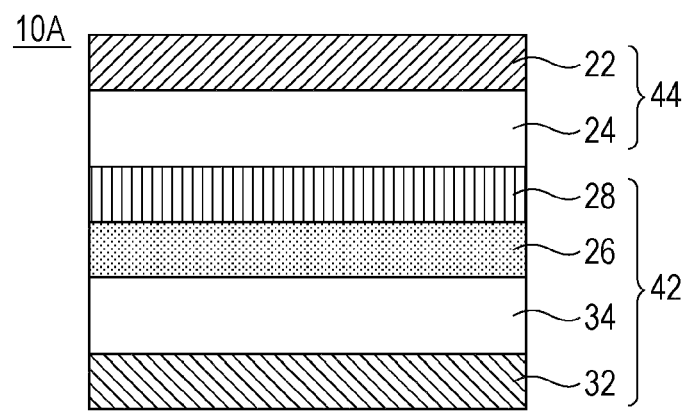
FIG. 2 is a schematic sectional view of a nonaqueous electrolyte secondary battery according to a modification.

Whereas the separator-integrated electrode is applied to a positive electrode in the nonaqueous electrolyte secondary battery 10 according to the embodiment illustrated above, the separator-integrated electrode is applied to a negative electrode in a nonaqueous electrolyte secondary battery 10A according to the modification described below with reference to FIG. 2. In FIG. 2, the same components as those of the nonaqueous electrolyte secondary battery 10 according to the foregoing embodiment are labeled with the same reference signs to avoid a detailed description thereof.

The nonaqueous electrolyte secondary battery 10A according to this modification includes a negative electrode 42 configured as a separator-integrated electrode and a positive electrode 44 disposed on the separator-integrated negative electrode 42.

The negative electrode 42 includes, in sequence, a negative current collector 32, a negative active material layer 34, a first porous layer 26 containing inorganic particles, and a second porous layer 28 containing a resin material. The positive electrode 44 includes a positive current collector 32 and a positive active material layer 24 disposed thereon.

The negative current collector 32 and the negative active material layer 34 of the negative electrode 42 may be configured in the same manner as those of the nonaqueous electrolyte secondary battery 10 according to the foregoing embodiment. Similarly, the positive current collector 22 and the positive active material layer 24 of the positive electrode 44 may be configured in the same manner as those of the nonaqueous electrolyte secondary battery 10 according to the foregoing embodiment.

The first porous layer 26 formed on the surface of the negative active material layer 34 of the negative electrode 42 is configured in the same manner as that of the nonaqueous electrolyte secondary battery 10 according to the foregoing embodiment. Similarly, the second porous layer 28 formed on the surface of the first porous layer 26 of the negative electrode 42 is configured in the same manner as that of the nonaqueous electrolyte secondary battery 10 according to the foregoing embodiment.

It should be noted, however, that the resin material for the first porous layer 26 is preferably dissolved in an organic solvent because the negative active material layer 34 is formed from a negative active material slurry containing water as a solvent. The composition and method of formation of the first porous layer 26 and the composition and method of formation of the second porous layer 28 on the first porous layer 26 may be the same as those of the nonaqueous electrolyte secondary battery 10 according to the foregoing embodiment. The thus-configured nonaqueous electrolyte secondary battery 10A according to this modification has the same advantageous effects as the nonaqueous electrolyte secondary battery 10 according to the foregoing embodiment.

In the nonaqueous electrolyte secondary battery 10A according to this modification, the negative active material layer 34 may be formed on each surface of the negative current collector 32. The first porous layer 26 and the second porous layer 28 may then be formed on the negative active material layer 34 on each side, and the positive electrode 44 may be disposed on each side.

REFERENCE SIGNS LIST

10, 10A electrode assembly
12 separator-integrated electrode
14 negative electrode
18 second porous layer
22 positive current collector
24 positive active material layer
26 first porous layer
28 second porous layer
32 negative current collector
34 negative active material layer
40 electrode assembly
42 separator-integrated electrode
44 positive electrode

The invention claimed is:

1. A separator-integrated electrode comprising a current collector, an active material layer formed on the current collector, and a porous layer formed on the active material layer, the porous layer comprising inorganic particles and resin fibers, wherein the porous layer comprises a first porous layer formed on the active material layer and comprising the inorganic particles and a second porous layer formed on the first porous layer and consisting essentially of the resin fibers.

2. The separator-integrated electrode according to claim 1, wherein the relationship $0.5 \leq x/(x+y) \leq 0.95$ is satisfied, where x is the average thickness of the second porous layer, and y is the average thickness of the first porous layer.

3. The separator-integrated electrode according to claim 1, wherein the resin fibers forming the second porous layer comprise at least one polymeric material selected from polypropylene, polyethylene, polystyrene, polyethylene oxide, polyethylene terephthalate, polybutylene terephthalate, polyethylene naphthalate, poly-m-phenylene terephthalate, poly-p-phenylene isophthalate, polyvinylidene fluoride, polytetrafluoroethylene, poly(vinylidene fluoride-tetrafluoroethylene) copolymer, poly(vinylidene fluoride-hexafluoropropylene) copolymer, poly(vinylidene fluoride-tetrafluoroethylene-hexafluoropropylene) copolymer, poly(tetrafluoroethylene-hexafluoropropylene) copolymer, polyvinyl chloride, polyvinylidene chloride-acrylate copolymer, polyacrylonitrile, polyacrylonitrile-methacrylate copolymer, polycarbonates, polyarylates, polyester carbonates, polyamides, aramids, polyimides, polycaprolactone, polylactic acid, polyvinyl alcohol, polyglycolic acid, collagen, polyhydroxybutyric acid, polyvinyl acetate, polypeptides, and copolymers thereof.

4. The separator-integrated electrode according to claim 1, wherein the inorganic particles in the first porous layer are at least one material selected from titania (excluding anatase), alumina, zirconia, and magnesia.

5. The separator-integrated electrode according to claim 1, wherein the resin fibers forming the second porous layer is formed by electrospinning.

6. The separator-integrated electrode according to claim 1, wherein
the first porous layer comprises a binder.

7. The separator-integrated electrode according to claim 6, wherein the first porous layer comprises the resin fibers.

8. The separator-integrated electrode according to claim 6, wherein the first porous layer consists essentially of the inorganic particles and the binder.

* * * * *